US 6,641,200 B2

(12) United States Patent
Rusu

(10) Patent No.: US 6,641,200 B2
(45) Date of Patent: Nov. 4, 2003

(54) TONNEAU COVER TAILGATE LATCH AND STAKE POCKET ATTACHMENT SYSTEM

(75) Inventor: William D. Rusu, West Bloomfield, MI (US)

(73) Assignee: ThyssenKrupp Budd Company, Troy, MI (US)

( * ) Notice: Subject to any disclaimer, the term of this patent is extended or adjusted under 35 U.S.C. 154(b) by 0 days.

(21) Appl. No.: 10/028,127

(22) Filed: Dec. 20, 2001

(65) Prior Publication Data

US 2002/0063438 A1 May 30, 2002

Related U.S. Application Data

(63) Continuation-in-part of application No. PCT/US01/01834, filed on Jan. 19, 2001.
(60) Provisional application No. 60/225,819, filed on Aug. 16, 2000, and provisional application No. 60/177,094, filed on Jan. 20, 2000.

(51) Int. Cl.[7] .................................................. B60J 7/16
(52) U.S. Cl. ..................................... 296/100.07; 296/43
(58) Field of Search ..................... 296/100.07, 100.02, 296/100.04, 100.06, 100.16, 43; 410/110, 106

(56) References Cited

U.S. PATENT DOCUMENTS

| 3,069,199 | A | 12/1962 | Reardon et al. |
|---|---|---|---|
| 3,420,570 | A | 1/1969 | Kunz |
| 3,489,456 | A | 1/1970 | Klanke |
| 3,514,152 | A | 5/1970 | Hermon |
| 3,704,039 | A | 11/1972 | Dean |
| 3,785,698 | A | 1/1974 | Dean et al. |
| 3,829,151 | A | 8/1974 | Fellelnstein |
| 4,124,247 | A | 11/1978 | Penner |
| 4,216,990 | A | 8/1980 | Musgrove et al. |
| 4,252,363 | A | 2/1981 | Rodrigue |
| 4,313,636 | A | 2/1982 | Deeds |
| D279,473 | S | 7/1985 | Hochstetler et al. |
| 4,615,557 | A | 10/1986 | Robinson |
| 4,730,866 | A | 3/1988 | Nett |
| 4,762,360 | A | 8/1988 | Huber |
| 4,807,921 | A | 2/1989 | Champie, III et al. |
| 4,824,162 | A | 4/1989 | Geisler et al. |
| 4,832,394 | A | 5/1989 | Macomber |
| 4,838,602 | A | 6/1989 | Nett |
| 4,861,092 | A | 8/1989 | Bogard |
| 4,901,963 | A | 2/1990 | Yoder |
| 4,946,217 | A | 8/1990 | Steffens et al. |

(List continued on next page.)

FOREIGN PATENT DOCUMENTS

| JP | 2540966 | 4/1997 |
|---|---|---|
| WO | WO 01/15924 | 3/2001 |
| WO | WO 01/53126 | 7/2001 |

*Primary Examiner*—Joseph D. Pape
(74) *Attorney, Agent, or Firm*—Harness, Dickey & Pierce, P.L.C.

(57) ABSTRACT

A tonneau cover attachment system for a motor vehicle having a cargo area defined by a first side wail having a stake pocket includes a first plate and a second plate. The first plate has a first end and a second end and is positioned within the stake pocket. The second plate has a first end and a second end. The second end of the second plate is coupled to the second end of the first plate. The first end of the first plate is coupled to the first end of the second plate.

25 Claims, 10 Drawing Sheets

U.S. PATENT DOCUMENTS

| | | |
|---|---|---|
| 4,953,820 A | 9/1990 | Yoder |
| 5,058,652 A | 10/1991 | Wheatley et al. |
| 5,121,960 A | 6/1992 | Wheatley |
| 5,165,743 A | 11/1992 | Zock |
| 5,183,309 A | 2/1993 | Jordan |
| 5,201,561 A | 4/1993 | Brown |
| 5,228,736 A | 7/1993 | Dutton |
| 5,251,950 A | 10/1993 | Bernardo |
| 5,263,761 A | 11/1993 | Hathaway et al. |
| 5,275,458 A | 1/1994 | Barben et al. |
| 5,301,913 A | 4/1994 | Wheatley |
| 5,310,238 A | 5/1994 | Wheatley |
| 5,322,336 A | 6/1994 | Isler |
| 5,324,089 A | 6/1994 | Schlachter |
| 5,344,159 A | 9/1994 | Powell |
| 5,385,377 A | 1/1995 | Girard |
| 5,460,423 A | 10/1995 | Kersting et al. |
| 5,480,206 A | 1/1996 | Hathaway et al. |
| 5,487,585 A | 1/1996 | Wheatley |
| 5,522,635 A | 6/1996 | Downey |
| 5,584,521 A | 12/1996 | Hathaway et al. |
| 5,632,522 A | 5/1997 | Gaitan et al. |
| 5,636,893 A | 6/1997 | Wheatley et al. |
| 5,653,491 A | 8/1997 | Steffens et al. |
| 5,655,808 A | 8/1997 | Wheatley |
| 5,688,017 A | 11/1997 | Bennett |
| 5,727,836 A | 3/1998 | Hosoya |
| 5,765,902 A | 6/1998 | Love |
| 5,857,729 A | 1/1999 | Bogard |
| 5,860,691 A | 1/1999 | Thomsen et al. |
| 5,882,058 A | 3/1999 | Karrer |
| 5,904,393 A | 5/1999 | Yoder |
| 5,906,407 A | 5/1999 | Schmeichel |
| 5,931,521 A | 8/1999 | Kooiker |
| 5,961,173 A | 10/1999 | Repetti |
| 6,000,744 A | 12/1999 | Kooiker |
| 6,024,402 A | 2/2000 | Wheatley |
| 6,053,557 A | 4/2000 | Kooiker |
| 6,065,794 A | 5/2000 | Schlachter |
| 6,082,806 A | 7/2000 | Bogard |
| 6,183,035 B1 | 2/2001 | Rusu et al. |
| 6,264,266 B1 | 7/2001 | Rusu et al. |
| 6,290,441 B1 * | 9/2001 | Rusu .......................... 410/106 |
| 6,338,520 B2 | 1/2002 | Rusu et al. |

* cited by examiner

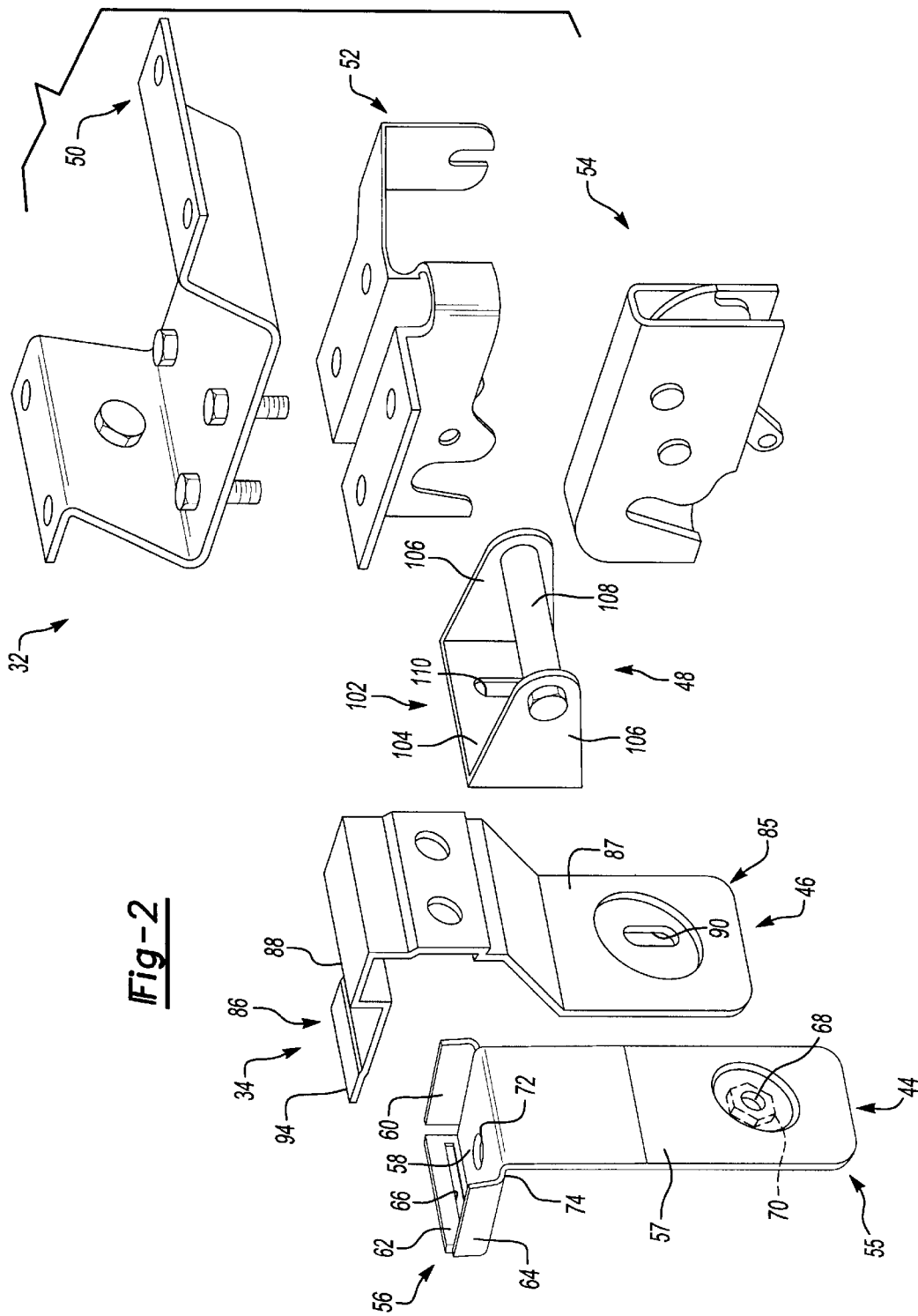

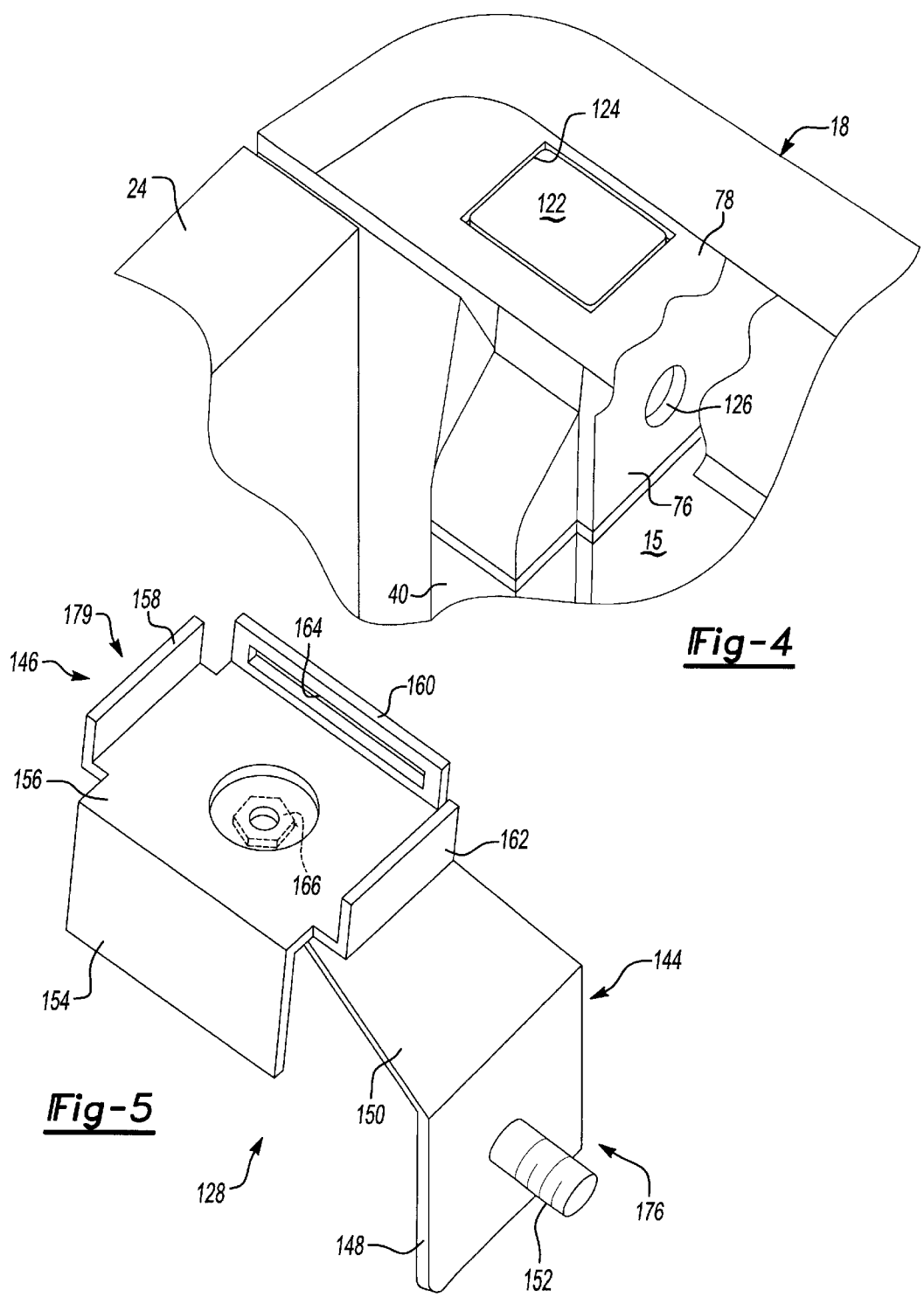

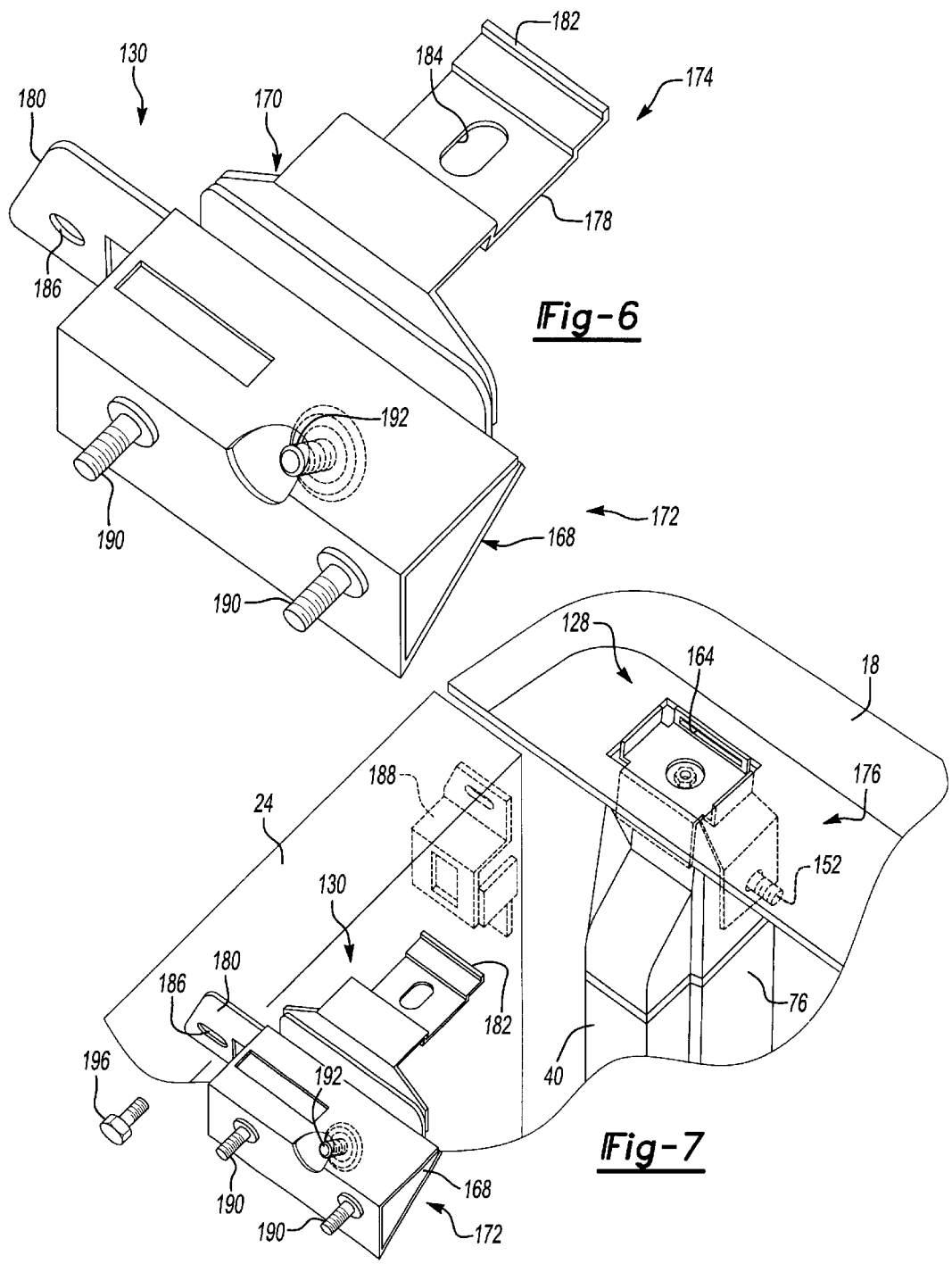

US 6,641,200 B2

TONNEAU COVER TAILGATE LATCH AND STAKE POCKET ATTACHMENT SYSTEM

CROSS-REFERENCE TO RELATED APPLICATIONS

This application is a continuation-in-part of International Application PCT/US01/01834 filed on Jan. 19, 2001, designating the United States, which claims priority to U.S. Provisional Patent Application No. 60/225,819 filed on Aug. 16, 2000 and Provisional Patent Application No. 60/177,094 filed on Jan. 20, 2000.

BACKGROUND OF THE INVENTION

1. Technical Field

The present invention relates to a tie down for securing cargo within the bed of a motor vehicle. More particularly, the present invention relates to a tie down removably mounted within the stake pocket of a pick-up truck.

2. Discussion

The use of a cargo carrying vehicle such as a pick-up truck often times involves the need to secure cargo in place. In addition, it is often advantageous to cover the open area of a pick-up truck with a tonneau cover, camper top or other similar device. Accordingly, operators of pick-up trucks and other cargo carrying vehicles commonly utilize the tie downs fixed around the perimeter of the truck bed to provide anchorages for securing the cargo located within the vehicle bed.

One type of tie down provides a hook or cleat type anchorage which is fastened to the vehicle side wall by screws or other threaded fasteners. In order to attach this type of tie down to the vehicle, additional fastener apertures must be drilled or punched through the vehicle wall. The drilling of the special fastener apertures is not only tedious and time consuming, but very likely detracts from the aesthetic appeal and resale value of the vehicle. Also, cutting or drilling into the sheet metal of the vehicle can, and often does, void warranty on the vehicle. Furthermore, access to both sides of the vehicle side wall may be limited thereby impeding attachment using a standard bolt and nut.

It is therefore an object of this invention to provide a stake pocket tie down which may be removably fitted to a pick-up truck side wall without drilling or cutting the side wall.

It is another object of the present invention to provide a tonneau cover latch releaseably engageable with an assembly secured to the stake pocket of the pick-up truck.

SUMMARY OF THE INVENTION

The invention includes a stake pocket tie down for a motor vehicle having a cargo area defined by an outer side wall, an inner side wall, a bed and a tailgate. The outer side wall has a stake pocket defined by a top surface and a downwardly extending flange. The stake pocket tie down includes a support plate assembly, a clamping plate assembly, a striker and bolts.

The support plate is inserted into the stake pocket with the clamping plate hooked over the top of the truck bed.

A weld nut on the support plate is aligned with an existing hole in the truck bed side wall, and an aligned hole in the clamping plate, and a bolt installed. A second bolt is installed into a second weld nut at the top to secure the support plate and clamp plate together at the top.

A striker bracket was previously attached to the clamping plate with two weld nuts and two bolts. This positions a striker bar to be engaged with a standard cable releaseable rotary latch mounted on the tonneau cover as shown.

A durable bracket assembly is designed to be installed in each stake pocket without requiring drilling holes in the cargo box sheet metal, each bracket assembly is adapted to mount a striker matable with a cable operated rotary latch mechanism attached to each corner of a tonneau panel cover. The brackets resist side to side movement of the tonneau panel cover caused by the lateral deflections of the cargo box normally occurring as the truck is driven, to greatly reduce seal wear which otherwise would occur.

Tonneau cover hinges can be at the front or center of the box instead of the rotary latch mechanisms. A tool box attachment could also be mounted to the bracket assemblies at the front of the cargo box instead of the rotary latch mechanisms.

A tailgate lock is also provided by mounting a downward projecting panel striker received in a slot in a receiver bracket on the tailgate and aligned with a slot in a plate assembly attached to the "D" pillar of the box. Thus, the tailgate is securely locked whenever the tonneau cover is latched in the down position.

BRIEF DESCRIPTION OF THE DRAWINGS

FIG. 2 is an exploded perspective view of a stake pocket tie down of the present invention;

FIG. 4 is a perspective top view of a portion of a truck vehicle side wall and tailgate;

FIG. 5 is a perspective view of a support plate of the present invention;

FIG. 6 is a perspective view of a clamping plate of the present invention;

FIG. 7 is partial exploded perspective view of a portion of the tonneau cover attachment system of the present invention;

DETAILED DESCRIPTION OF THE PREFERRED EMBODIMENTS

Figure 1:
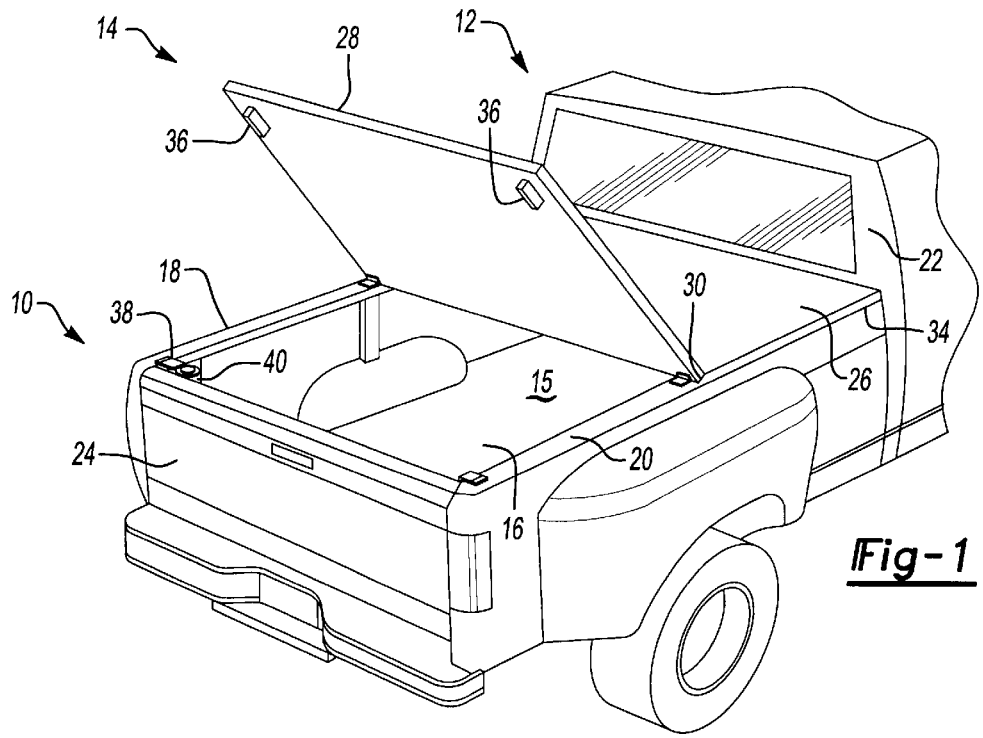
FIG. 1 is a perspective view of an exemplary vehicle equipped with a tonneau cover attachment system constructed in accordance with the teachings of the present invention.

A tonneau cover stake pocket attachment system and tailgate interlock constructed in accordance with the teachings of the present invention is generally indicated by reference numeral 10. Attachment system 10 is shown interconnecting an exemplary vehicle 12 and a tonneau cover assembly 14. In the preferred embodiment, the vehicle 12 is a pick-up truck having a cargo area 15 generally defined by a bed 16, a first side wall 18, a second side wall 20, an end wall 22 and a tailgate 24.

In one embodiment and as best shown in FIG. 1, tonneau cover assembly 14 includes a first cover 26 and a second cover 28 interconnected by a hinge 30. Hinge 30 is coupled to each of the first and second side walls by attachment system 10 or another suitable mechanism. The attachment system 10 of the present invention functions to conveniently and securely couple at least the non-hinged ends of covers 26 and 28 to vehicle 12. Specifically, first cover 26 includes a pair of cable actuated rotary latches 32 (FIG. 2) selectively engaging a first pair of stake pocket tie downs 34 (FIG. 2). Second cover 28 includes a second pair of rotary latches 36 for selective interconnection with a second pair of stake pocket tie downs 38. Second pair of stake pocket tie downs 38 are configured to mount to a "D" pillar 40 located near the rearward edge of each of first and second side walls 18 and 20, respectfully. Each second stake pocket tie down 38 optionally includes a tailgate interlock for structurally interconnecting second cover 28, first side wall 18, tailgate 24 and second side wall 20.

Figure 3:
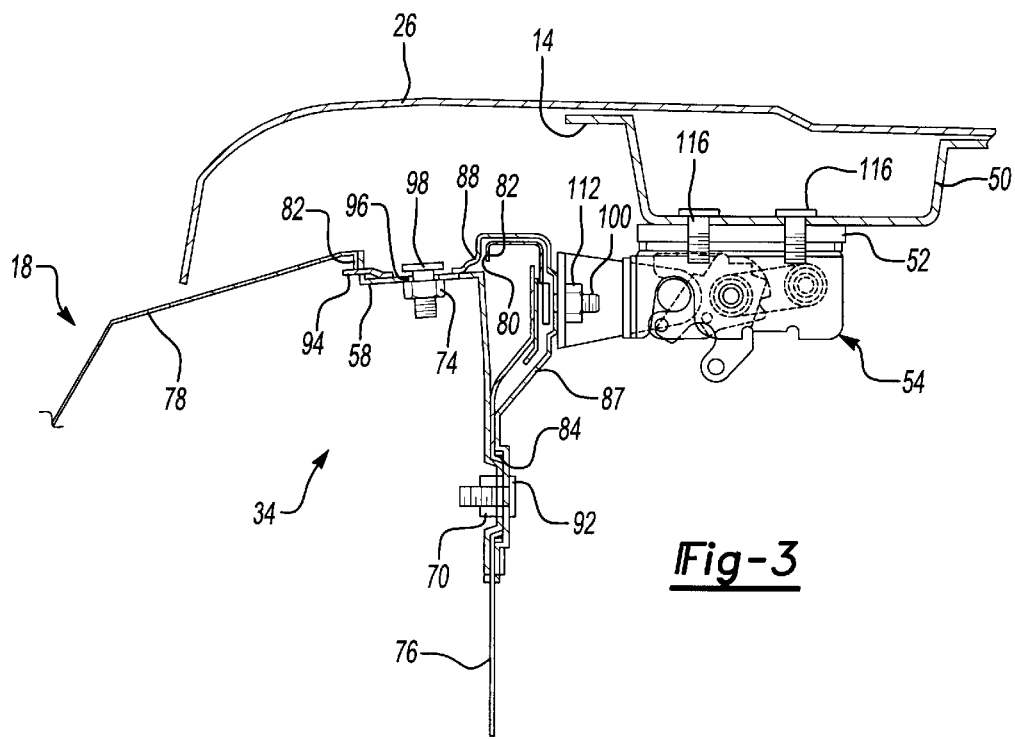
FIG. 3 is partial cross-sectional view of a vehicle and tonneau cover attached in accordance with the teachings of the present invention.

With reference to FIGS. 2 and 3, first stake pocket tie down 34 functions to provide a secure point of attachment for first cover 26 to each of first and second side walls 18 and 20. It should be appreciated that the pair of first stake pocket tie downs 34 are mirror images of one another. Accordingly, only one stake pocket tie down 34 will be described in detail.

First stake pocket tie down 34 includes a support plate 44, a clamping plate 46 and a striker 48 coupled to vehicle 12. A set of mating latch components are mounted to first cover 26. The latch components include a cover bracket 50, a rotary latch bracket 52 and a rotary latch 54.

Support plate 44 is a generally "L" shaped member having a first end 55 and a second end 56. Support plate 44 includes a generally vertically oriented first leg 57 and a generally horizontally oriented second leg 58. Three up-turned flanges 60, 62 and 64 extend substantially orthogonally from second leg 58. Up-turned flange 62 includes a slot 66 for receipt of a portion of clamping plate 46 as will be described in greater detail hereinafter. First leg 57 includes an aperture 68 and corresponding weld nut 70 aligned with aperture 68. Similarly, second leg 58 includes an aperture 72 and corresponding weld nut 74 to facilitate interconnection of support plate 44 and clamping plate 46.

First side wall 18 includes an inner panel 76 and an outer panel 78. Outer panel 78 defines a stake pocket 80 having down-turned flanges 82. Inner panel 76 includes an aperture 84 to provide access to the stake pocket.

Clamping plate 46 is a generally "L" shaped member having a first end 85 and a second end 86. Clamping plate 46 includes a first leg 87 and a second leg 88. First leg 87 is shaped to compliment the profile of inner panel 76 and is positioned generally adjacent thereto. First leg 87 includes an aperture 90 for receipt of a fastener 92. Fastener 92 is threadingly engaged with weld nut 70 to couple first end 85 of clamping plate 46 with first end 55 of support plate 44. Second leg 88 terminates at a tongue 94 positioned within slot 66 and engaged with one of down-turned flanges 82 of stake pocket 80. Second leg 88 includes an aperture 96 for receipt of a fastener 98 interconnecting each of the second legs 58 and 88. First leg 87 also includes a pair of inwardly protruding studs 100 fixed to first leg 87 by a method known in the art such as welding.

Striker 48 includes a generally "U" shaped body 102 having an end wall 104 and a pair of side walls 106. Each of side walls 106 are interconnected by a bar 108 spaced apart from end wall 104. End wall 104 includes a pair of elongated apertures 110 extending therethrough. Elongated apertures 110 cooperate with studs 100 and a pair of nuts 112 to adjustably interconnect striker 48 to vehicle 12.

With continued reference to FIG. 3, cover bracket 50 includes a pair of flanges 114 coupled to first cover 26. Cover bracket 50 also includes a pair of downwardly extending threaded fasteners 116 fixed thereto. Rotary latch bracket 52 interconnects rotary latch 54 and cover bracket 50 to position rotary latch 54 in coupling engagement with striker 48. Rotary latch 54 may be selectively released by translating a cable (not shown). As such, rotary latch 54 may be remotely released from engagement with striker bar 108.

First stake pocket tie down 34 may be coupled to vehicle 12 by first positioning support plate 44 within stake pocket 80 and aligning first leg 57 with inner panel 76. Tongue 94 of clamping plate 46 is disposed within slot 66 of support plate 44. It should be appreciated that tongue 94 extends beyond flange 62 and down-turned flange 82 to resist movement of first stake pocket tie down 34 in an upward direction. Fastener 92 is engaged with weld nut 70 to interconnect support plate 44 and clamping plate 46 while sandwiching inner panel 76 therebetween. Fastener 98 is threadingly engaged with weld nut 74 to couple second leg 58 and second leg 88 thereby maintaining engagement of tongue 94 within slot 66.

With reference to FIG. 4, a rear driver's side corner of cargo area 15 is depicted. As referenced earlier, second stake pocket tie down 38 is specifically adapted to engage D pillar 40 and structurally interconnect first side wall 18, second cover 28 and tailgate 24. The rear driver's side corner of cargo area 15 includes a stake pocket 122 substantially similar to stake pocket 80 previously described. Specifically, outer panel 78 includes down-turned flanges 124 to define the periphery of the stake pocket. Inner panel 76 includes D pillar 40 to increase the structural rigidity of first side wall 18 and an aperture 126 to provide access to stake pocket 122.

Figure 13:
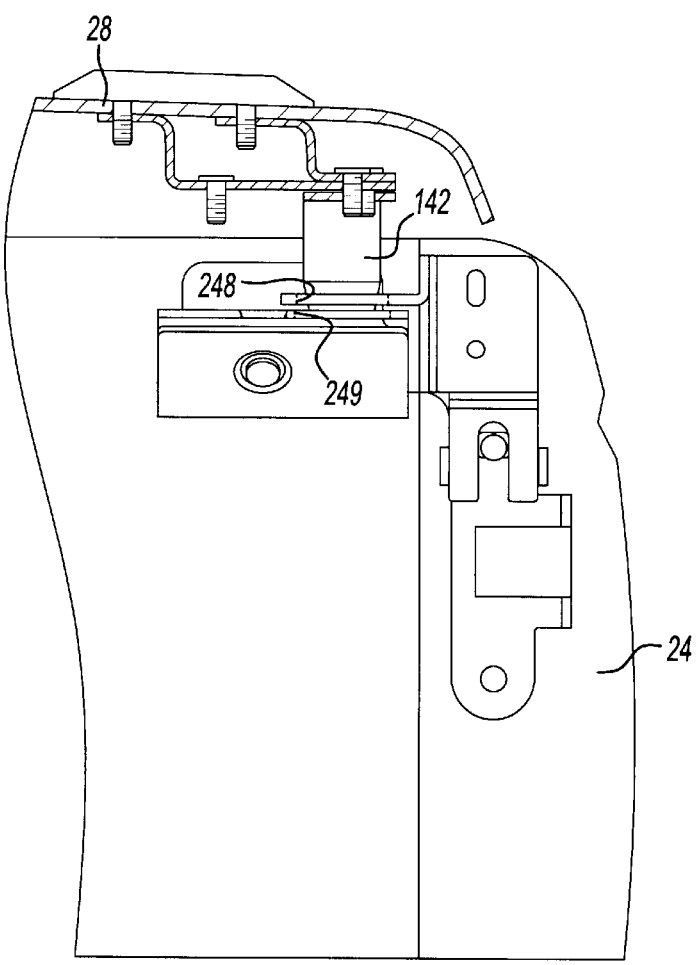
FIG. 13 is a cross-sectional side view of the tonneau cover attachment mechanism of the present invention.

With reference to FIGS. 5–10, second stake pocket tie down 38 includes a support plate or inner mounting assembly 128, a clamping plate or outer mounting assembly 130, a D pillar attachment plate 132 and a striker 134. To releaseably secure second cover 28 to vehicle 12, second cover 28 includes a panel bumper 136, a rotary latch bracket 138, a rotary latch 140 and a panel blade 142 (FIGS. 11 and 13).

With specific reference to FIG. 5, inner mounting assembly 128 includes a generally "L" shaped first plate 144 coupled to a second plate 146. First plate 144 includes a first leg 148 and a second leg 150. First leg 148 has a fastener 152 welded thereto. Second plate 146 also includes a first leg 154 and a second leg 156. Up-turned flanges 158, 160 and 162 extend substantially orthogonally from second leg 156. Up-turned flange 160 includes a slot 164 for receipt of a portion of outer mounting assembly 130. Preferably, inner mounting assembly 128 is fabricated by welding second leg 150 to second leg 156. A nut 166 is aligned with a pair of apertures extending through first plate 144 and second plate 146 and secured thereto.

With reference to FIGS. 6 and 7, outer mounting assembly 130 includes a generally triangularly shaped base 168 coupled to a generally "L" shaped plate 170. Outer mounting assembly 130 includes a first end 172 and a second end 174. First end 172 is constructed to interconnect with a first end 176 of inner mounting assembly 128. Plate 170 includes a first leg 178 and a second leg 180. First leg 178 terminates at a tongue 182 for engagement with slot 164 of inner mounting assembly 128. First leg 178 further includes an elongated slot 184 to provide for lateral adjustment of outer mounting assembly 130 relative to inner mounting assembly 128. A fastener (not shown) is disposed within slot 184 and threadingly engaged with nut 166 to couple second end 174 to a second end 179 of inner mounting assembly 128. Second leg 180 includes an elongated slot 186 for interconnection with first side wall 18. It should be appreciated that slot 186 is sized and positioned to utilize a pre-existing fastener location.

Figure 8:
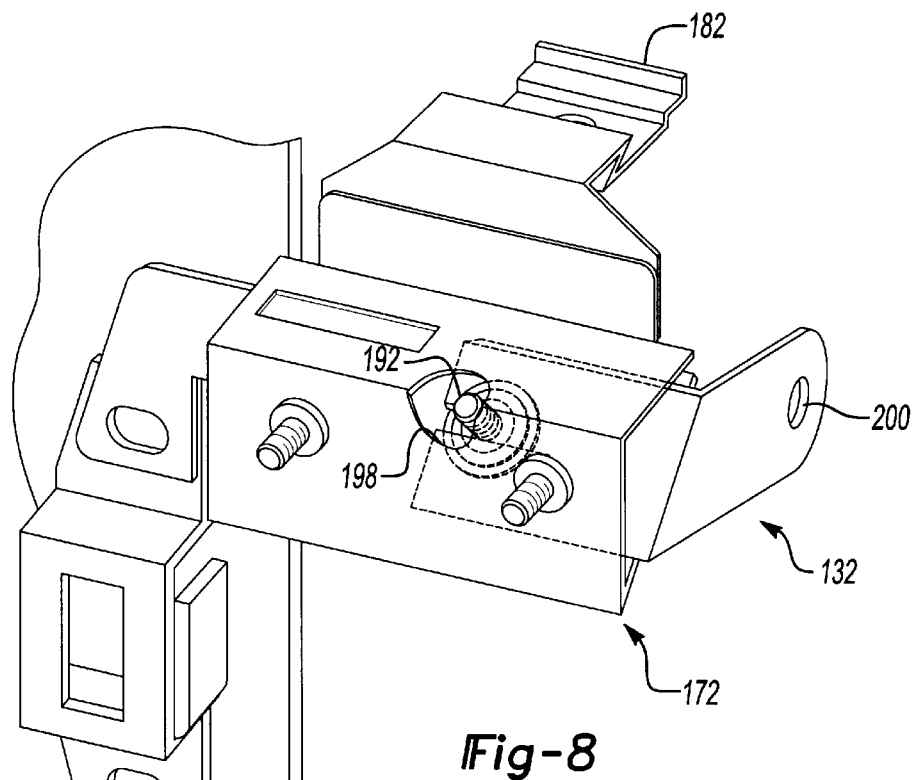
FIG. 8 is a perspective view of an outer mounting assembly coupled to the vehicle.

Specifically, and with reference to FIGS. 7 and 8, second leg 180 is coupled to a box bracket 188 provided as part of the standard latching mechanism between tailgate 24 and first side wall 18. A pair of studs 190 are coupled to base 168 and project inwardly therefrom. An additional stud 192 is coupled to base 168. Stud 192 acts in conjunction with D pillar attachment plate 132 to interconnect first end 172 of outer mounting assembly 130 with a first end 176 of inner mounting assembly 128.

Figure 9:
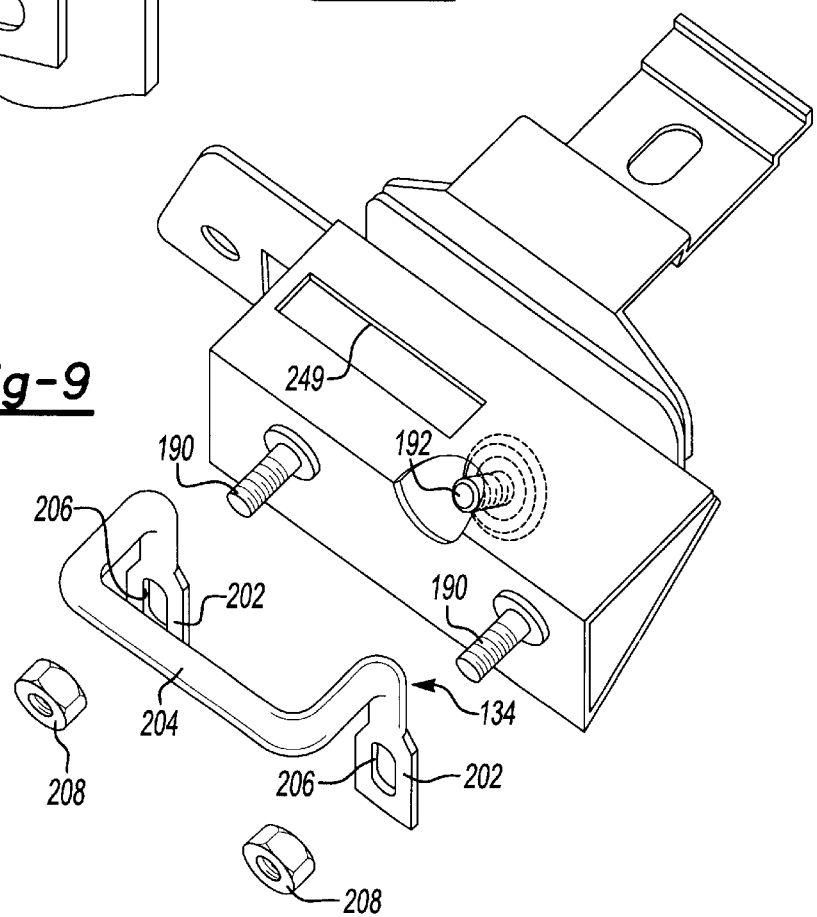
FIG. 9 is an exploded perspective view depicting assembly of a striker bar to the attachment system of the present invention.

The preferred operational steps of coupling second stake pocket tie down 38 to vehicle 12 are best depicted in FIGS. 8 and 9. Inner mounting assembly 128 is located within stake pocket 122 and positioned such that fastener 152 protrudes through aperture 126 formed in inner panel 76. Tongue 182 of outer mounting assembly 130 is inserted within slot 164 while the mounting assembly is positioned at an angle of approximately 45 degrees above the final installation position shown in the FIGS. Once tongue 182 is engaged within slot 164, outer mounting assembly 130 is pivoted downwardly to meet with D pillar 40 thereby interlocking inner mounting assembly 128 and outer mounting assembly 130. At this time, an existing upper screw 196 attaching box bracket 188 to first side wall 18 is removed and reinserted through slot 186 of second leg 180 and box bracket 188 to interconnect outer mounting assembly 130 with first side wall 18.

D pillar attachment plate 132 is next added to the assembly. D pillar attachment plate 132 includes a slot 198 and an aperture 200. D pillar attachment plate 132 functions to interconnect first end 172 to first end 176 by coupling stud 192 to fastener 152. Once slot 198 is positioned about stud 192 and fastener 152 is disposed through aperture 200, nuts (not shown) are threadingly engaged with each of the fasteners to sandwich inner panel 76, containing D pillar 40, between inner mounting assembly 128 and outer mounting assembly 130.

With reference to FIG. 9, striker 134 includes a pair of mounting flanges 202 interconnected by a striker bar 204. Each of the mounting flanges 202 includes an elongated slot 206 for cooperation with studs 190. Nuts 208 securely fasten striker 134 to second stake pocket tie down 38. It should be appreciated that striker 134 may be replaced with a bracket to allow tonneau cover assembly 14 to pivot instead of releaseably latch. Similarly, striker 134 may be replaced with suitable hardware to facilitate attachment of vehicle accessories such as tool storage bins or cargo nets. Additionally, striker 134 may be used as a cleat for securing cargo when the tonneau cover is not present.

Figure 10:
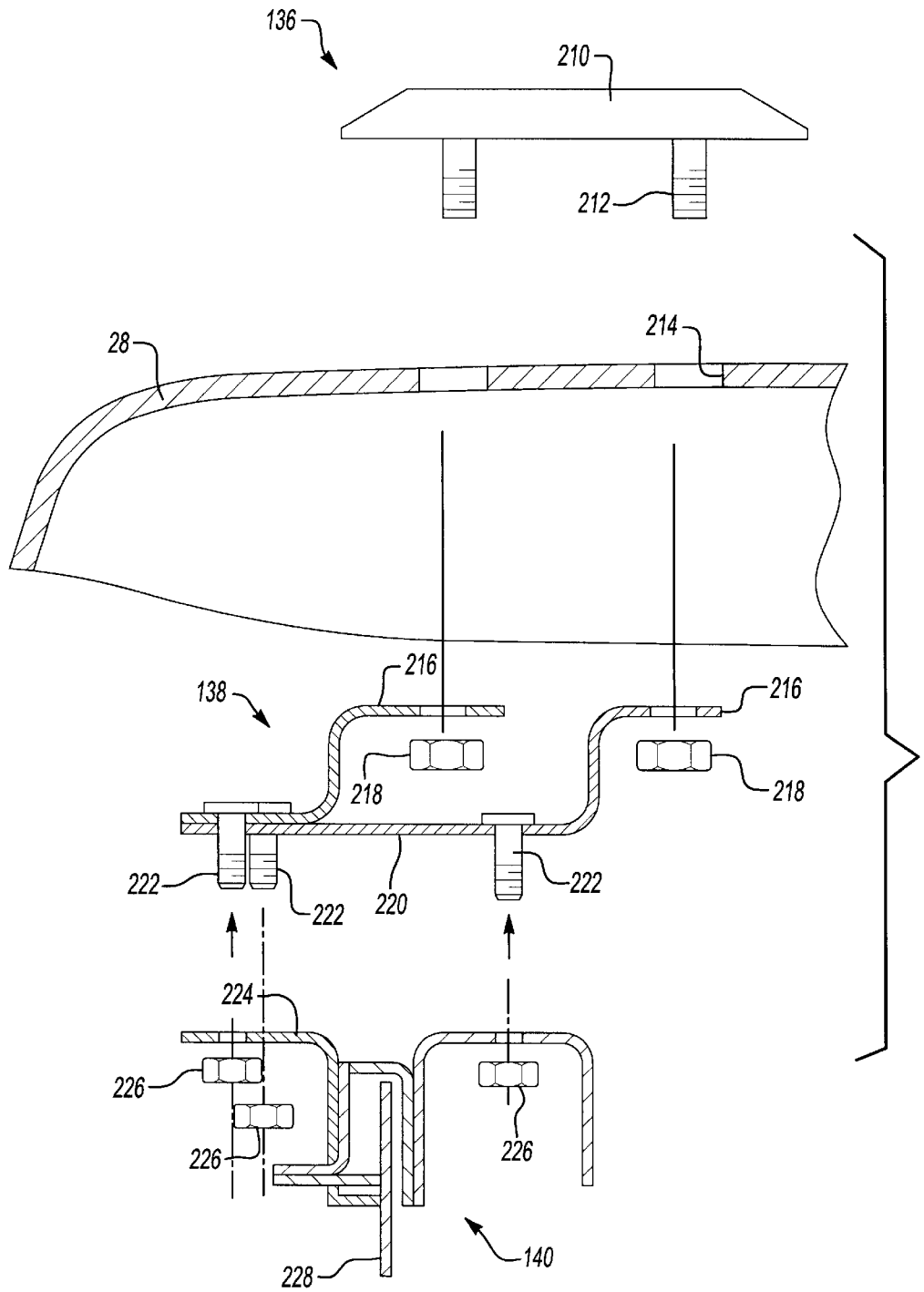
FIG. 10 is an exploded sectional view of the attachment hardware coupled to one of the covers of the present invention.
Figure 11:
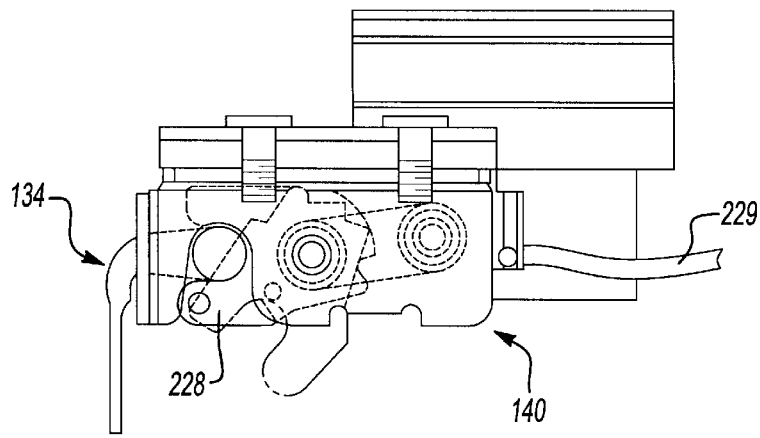
FIG. 11 is a side view of a rotary latch of the present invention.

The latch components coupled to second cover 28 are depicted in FIGS. 10 and 11. Panel bumper 136 includes an elastomeric body 210 having four integrally molded studs 212 protruding therefrom. Second cover 28 includes a corresponding set of apertures 214 for receipt of studs 212. Rotary latch bracket 138 has a pair of mounting flanges 216 with apertures positioned and sized to receive studs 212. Nuts 218 threadingly engage studs 212 thereby coupling rotary latch bracket 138 to second cover 28. Rotary latch bracket 138 also includes an offset flange 220 having a plurality of studs 222 integrally coupled thereto. Studs 222 extend downwardly toward cargo area 15 and function to removeably couple rotary latch 140 to second cover 28. Specifically, rotary latch 140 has a mounting flange 224 coupled to offset flange 220 via nuts 226. Rotary latch 140 has a catch 228 rotatably coupled to mounting flange 224. Catch 228 is rotatable from an open position to a closed position upon impact with striker 134. Once striker 134 forces catch 228 into the closed position, the internal mechanism of rotary latch 140 locks catch 228 in place thereby resisting an opening force placed upon the cover. Catch 228 may be selectively released from its locked position by translating a cable 229 coupled to the release mechanism. Accordingly, each of the tonneau cover panels may be remotely unlocked by a solenoid, key actuated system or lever located on the tonneau cover assembly or at a more distant point therefrom. One skilled in the art will appreciate that the cover and latch assembly described to this point may be utilized with either first stake pocket tie down 34 or second stake pocket tie down 38 due to the simple interconnection of catch 228 and striker 48 or 134.

Figure 12:
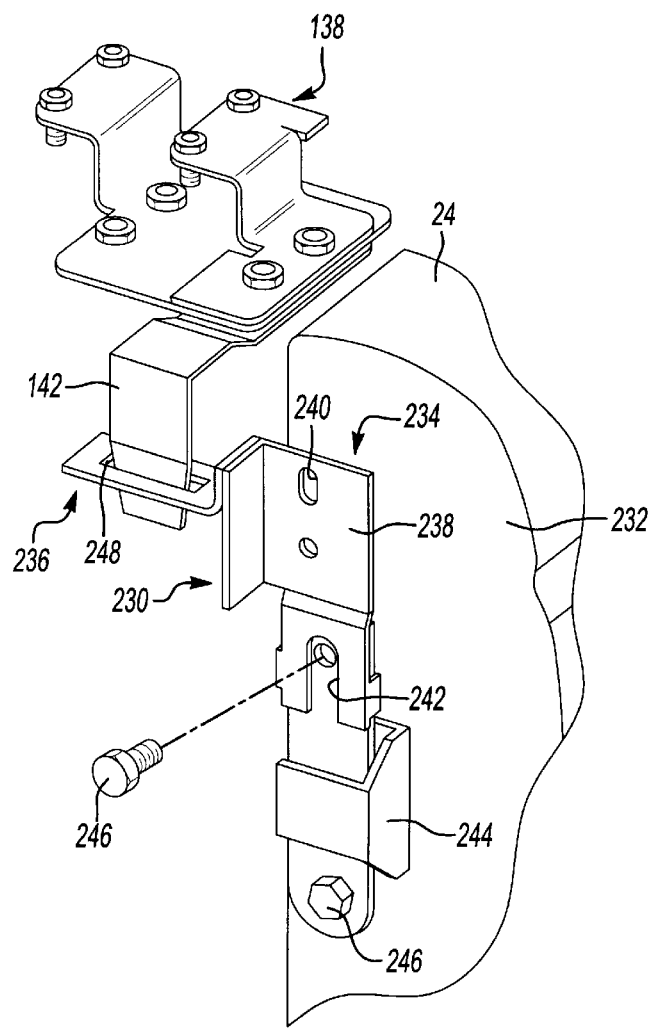
FIG. 12 is an exploded perspective view of a tailgate of an exemplary vehicle.

With reference to FIG. 12, panel blade 142 is an optional component coupled to rotary latch 140 and rotary latch bracket 138 which functions to structurally interconnect second cover 28, tailgate 24 and first side wall 18. In addition, panel blade 142 acts as a tailgate lock preventing opening of tailgate 24 when second cover 28 is in the latched or closed position.

To accomplish these functions, a receiver bracket 230 is coupled to an end wall 232 of tailgate 24. Receiver bracket 230 is preferably a weldment of a first angle bracket 234 and a second angle bracket 236. First angle bracket 234 includes a mounting flange 238 having apertures 240 and a slot 242 to rigidly fasten receiver bracket 230 to tailgate 24. Tailgate 24 typically includes an existing latch bracket 244 having a pair of fasteners 246 securing it to the tailgate. To install receiver bracket 230, upper most fastener 246 is loosened to allow mounting flange 238 to pass beneath the head of the fastener within slot 242. Second angle bracket 236 includes a striker slot 248 for receipt of panel blade 142 when second cover 28 is in the closed position. As best shown in FIG. 13, when tailgate 24 is closed, striker slot 248 of receiver bracket 230 aligns with a slot 249 of outer mounting assembly 130. As second cover 28 is articulated from an open position to a closed position, panel blade 142 passes through slot 249, striker slot 248 and effectively pinning each of the components together.

Figure 14:
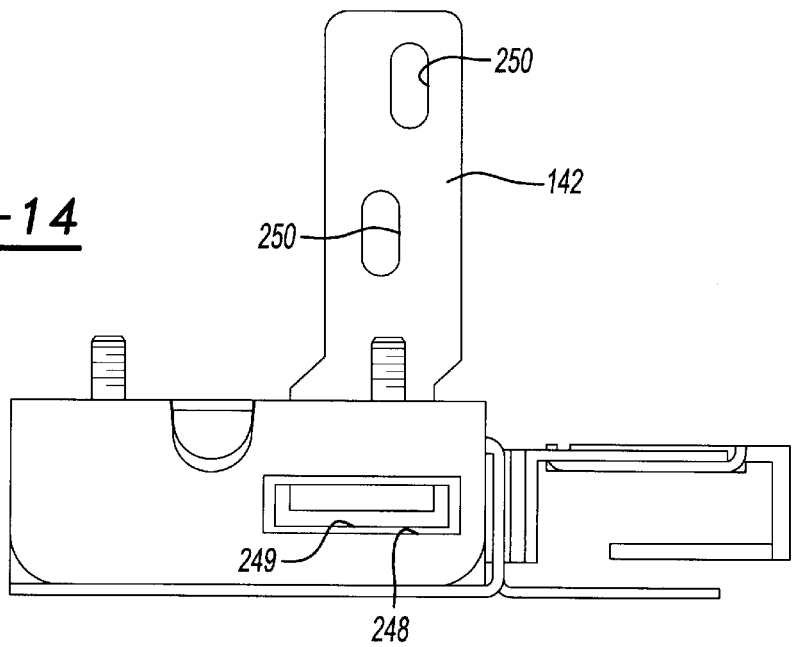
FIG. 14 is a top view of the panel striker and stake pocket tie down of the present invention.

FIG. 14 depicts an elongated set of apertures 250 positioned in panel blade 142 to provide for overall vehicle and tonneau cover assembly width variations. Accordingly, cross-car positioning adjustments may be made regarding the location of panel blade 142 to assure proper alignment with striker slot 248 and slot 249. It should also be appreciated that striker slot 248 and slot 249 are elongated a distance greater than the width of panel blade 142 to allow fore-aft variation in component tolerances.

Figure 15:
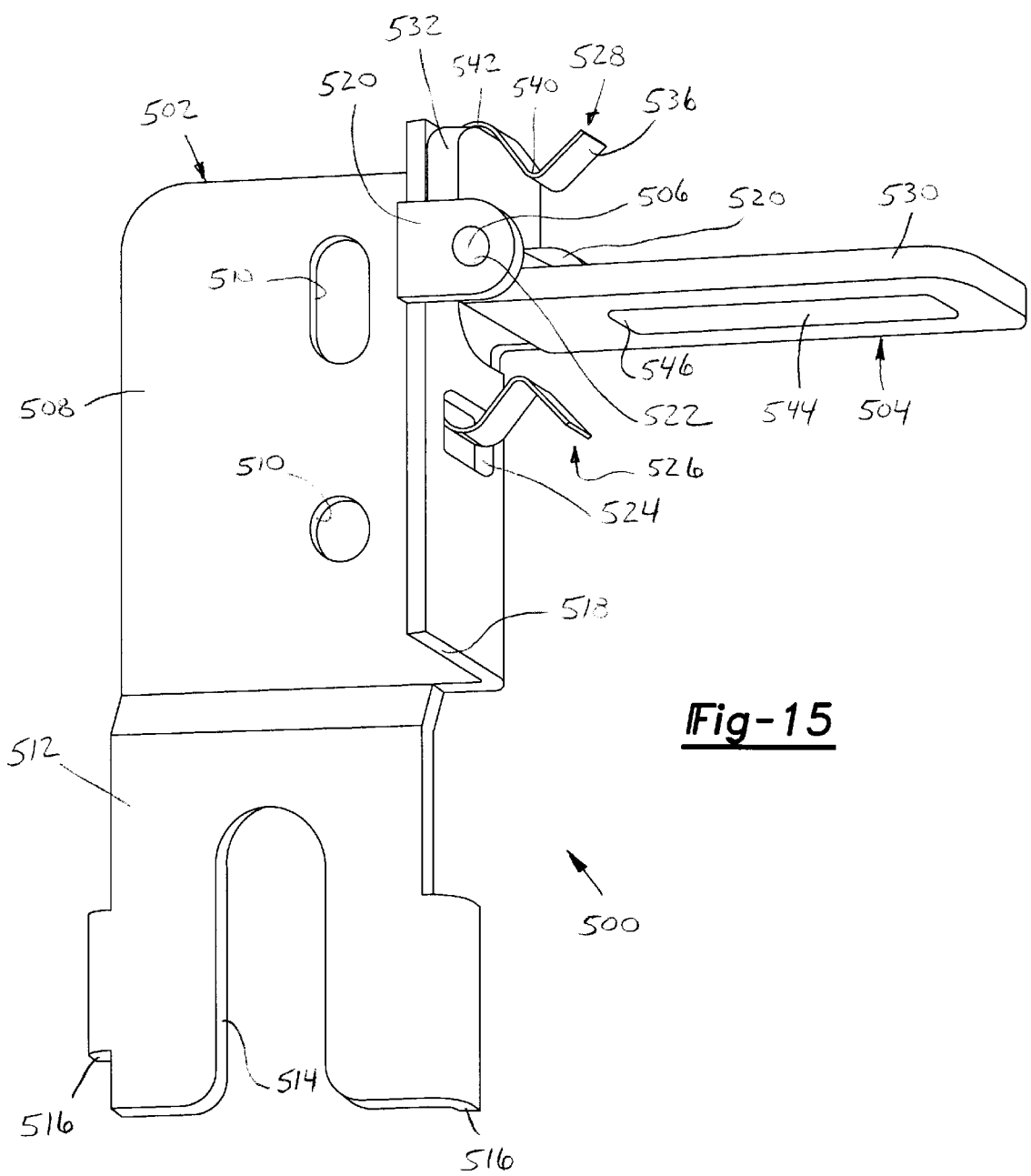
FIG. 15 is a perspective view of a second embodiment tailgate latch constructed in accordance with the teachings of the present invention.

A second embodiment receiver bracket or tailgate latch 500 is depicted in FIG. 15. Tailgate latch 500 includes a first bracket 502 and a second bracket 504. Second bracket 504 is pivotally interconnected to first bracket 502 via a pin 506. First bracket 502 includes a mounting flange 508 having apertures 510 extending therethrough. First bracket 502 also includes a secondary mounting flange 512 offset from mounting flange 508. Secondary mounting flange 512 includes a slot 514 and a pair of tabs 516 extending downwardly therefrom. First bracket 502 also includes a support flange 518 orthogonally intersecting mounting flange 508. Support flange 518 includes a pair of bifurcated legs 520 extending substantially orthogonally from support flange 518. Each of legs 520 includes an aperture 522 for receipt of pin 506. Support flange 518 includes an aperture 524 for receipt of a first clip 526. A second clip 528 is spaced apart from first clip 526 and coupled to one end of support flange 518. First clip 526 and second clip 528 are preferably constructed from a resilient material such as spring steel. One skilled in the art will appreciate that first clip 526 and second clip 528 may be integrally formed as a one-piece retainer having ends as described hereinafter.

Figure 16:
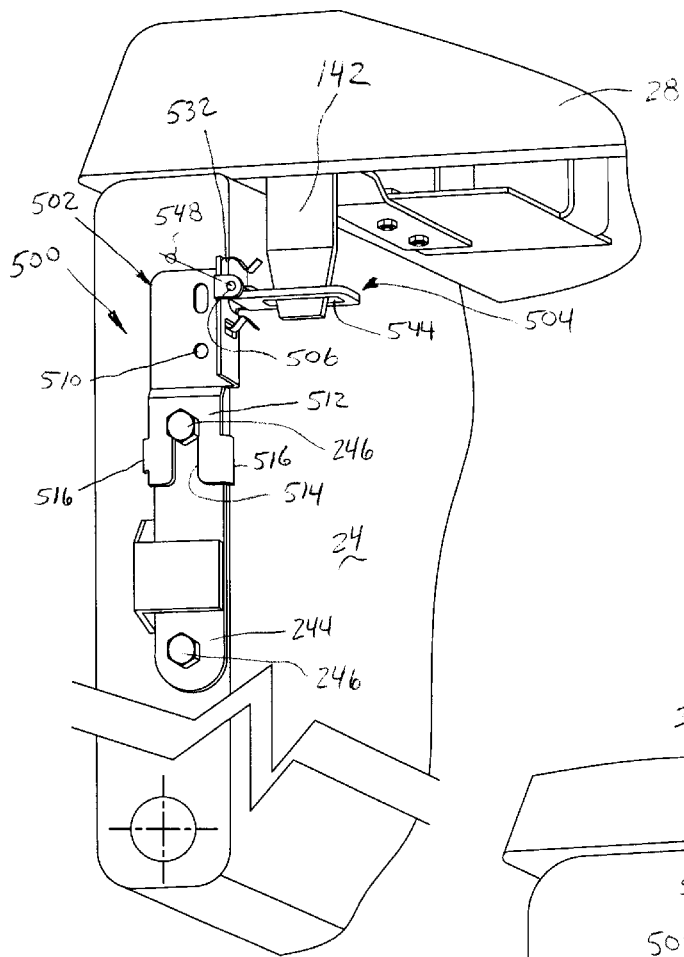
FIG. 16 is a partial perspective view of the panel striker engaging the tailgate latch in the locked position.

Second bracket 504 is a generally "L" shaped member having a first leg 530 and a second leg 532. Second leg 532 is sized to biasedly engage second clip 528 when second bracket 504 is located in a "locked position" as shown in FIGS. 15 and 16. Second clip 528 includes a guide portion 536 positioned at its distal end. Second clip 528 also includes a curvilinear portion 540 and a detent portion 542. Second bracket 504 is retained in the locked position once second leg 532 is rotated past guide portion 536 and curvilinear portion 540 into the region defined by detent portion 542. Second clip 528 is constructed to biasedly deform as second leg 532 rotates to and from a position proximate detent portion 542.

Figure 17:
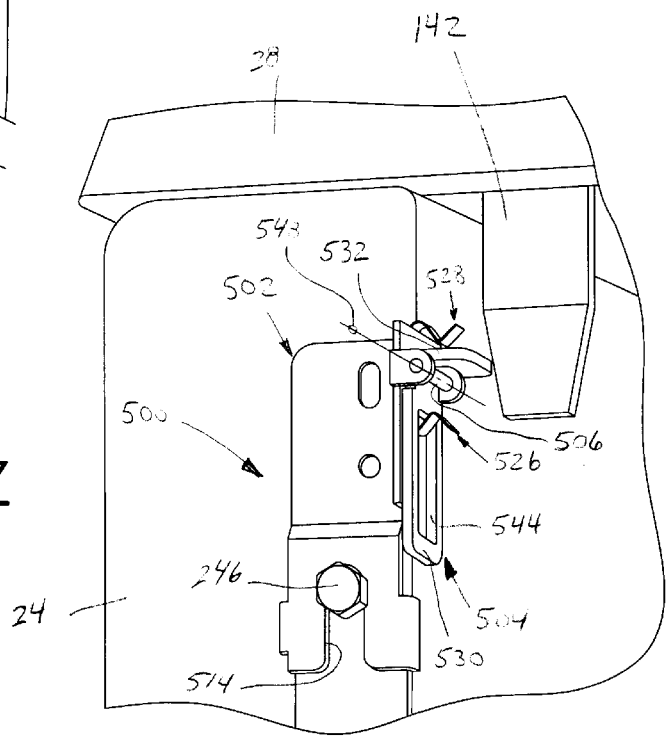
FIG. 17 is a partial perspective view of the tailgate latch positioned in the unlocked position with the panel striker disengaged therefrom.

As shown in the figures, first clip 526 is shaped substantially as the mirror image of second clip 528. First clip 526 is selectively engageable with first leg 530 when second bracket 504 is placed in an "unlocked position" as shown in FIG. 17. First leg 530 includes an elongated slot 544 extending therethrough. Slot 544 is positioned and sized to allow a portion of first clip 526 to pass through first leg 530. An edge 546 of slot 544 biasedly engages first clip 526 as second bracket 504 is rotated from the locked position to the unlocked position. Second bracket 504 is retained in the locked position once edge 546 is positioned adjacent the detent portion of first clip 526.

Tailgate 24 typically includes an existing latch bracket 244 having a pair of fasteners 246 securing it to the tailgate. Tailgate latch 500 is installed by loosening the uppermost fastener 246 thereby allowing secondary mounting flange 512 to pass beneath the head of the fastener. The body of the fastener is positioned within slot 514. After installation of tailgate latch 500, tabs 516 are positioned adjacent the edges of latch bracket 244. Tabs 516 function as anti-rotational devices thereby allowing tailgate latch 500 to be fixed to the tailgate with only one fastener. If additional restraint is required, fasteners (not shown) may be inserted through apertures 510 to engage existing mounting locations within the tailgate and couple tailgate latch 500 to tailgate 24.

In operation, a user may selectively dispose second bracket 504 in the locked position or unlocked position by manually rotating the bracket about an axis 548 extending through pin 506. An operator may rotate second bracket 504 when tailgate 24 is in an open position or when second cover 28 is in an open position. Second bracket 504 is shown rotated into the locked position in FIG. 16. When second bracket 504 is rotated to the locked position and tailgate 24 is in the closed position, panel blade 142 passes through slot 544 as second cover 28 is closed. It should be appreciated that tailgate 24 may not be opened without first rotating second cover 28 from its closed to at least a partially open position.

Alternatively, a user may rotate second bracket 504 to the unlocked position shown in FIG. 17. In the unlocked position, panel blade 142 is positioned adjacent to first leg 530 of second bracket 504 when both tailgate 24 and second cover 28 are in their closed positions. Panel blade 142 does not engage second bracket 504 thereby allowing a user to open tailgate 24 while second cover 28 is in the closed position. One skilled in the art will appreciate that tailgate latch 500 need not be used in conjunction with a stake pocket tie down system as previously described. The tailgate latch of the present invention functions to provide a selective interconnection between tailgate 24 and panel blade 142 of second cover 28. Therefore, tailgate latch 500 may be advantageously implemented for use with tonneau cover attachment systems with or without stake pocket tie downs.

As previously described, the tonneau cover attachment system of the present invention provides a simple and cost effective method and apparatus for interconnecting a tonneau cover to a vehicle in a robust manner. The tonneau cover attachment system utilizes existing stake pocket and side wall geometry to allow for installation of the system without requiring an installer to modify the vehicle body. Additionally, the tonneau cover tailgate latch of the present invention allows a user to selectively enable or disable a tailgate latch to allow a user to open the tailgate of the vehicle without displacing the tonneau cover if so desired.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims:

What is claimed is:

1. A tonneau cover attachment system for a motor vehicle having a cargo area defined by a first side wall, a second side wall, a bed and a tailgate, the first side wall having a stake pocket defined by an outer panel and an inner panel, the tonneau cover attachment system comprising:

a support plate having a first end and a second end, said second end having a slot extending therethrough;

a clamping plate having a first end and a second end, said second end including a tongue positioned in said slot, wherein said first end of said support plate and said first end of said clamping plate are interconnected and adapted to sandwich the inner panel of the first side wall therebetween;

a striker coupled to said clamping plate; and a tonneau cover having a panel adapted to cover at least a portion of the cargo area, the tonneau cover having a latch selectively engageable with said striker thereby releaseably coupling said panel to said striker.

2. The tonneau cover attachment system of claim 1 wherein said second end of said support plate is coupled to said second end of said clamping plate at a predetermined distance from said slot.

3. The tonneau cover attachment system of claim 2 wherein said tongue is adapted to engage the outer panel of the first side wall.

4. The tonneau cover attachment system of claim 3 wherein said clamping plate is adapted to biasedly engage the first side wall.

5. The tonneau cover attachment system of claim 4 wherein said tonneau cover panel is adapted to pivotably mount to the vehicle.

6. The tonneau cover attachment system of claim 1 further including an attachment plate interconnecting said first end of said clamping plate and said first end of said support plate.

7. The tonneau cover attachment system of claim 1 further including a receiver bracket adapted to be coupled to the tailgate and wherein said panel includes a panel blade selectively interconnecting said receiver bracket, said clamping bracket and said panel.

8. The tonneau cover attachment system of claim 7 wherein said clamping plate includes an aperture and said receiver bracket includes an aperture aligned with said clamping plate aperture when the tailgate is in a closed position.

9. A vehicle comprising:
a cargo area defined by side walls having a stake pocket;
a cover at least partially enclosing said cargo area;
a first plate having a first end and a second end, each of said first and second ends positioned within said stake pocket;
a second plate having a first end and a second end, said second end of said second plate positioned within said stake pocket and coupled to said second end of said first plate;
wherein said first end of said first plate and said first end of said second plate are interconnected thereby capturing said side wall therebetween and wherein said cover is detachably coupled to one of said first and second plates.

10. The vehicle of claim 9 where said second end of said first plate includes a slot and wherein said second end of said second plate includes a tongue engaged with said slot.

11. The vehicle of claim 10 wherein said tongue engages said side wall.

12. The vehicle of claim 11 wherein said second ends of said first and second plates are interconnected at a second location spaced apart from said slot.

13. The vehicle of claim 12 wherein said second plate includes a striker and wherein said cover includes a latch selectively engageable with said striker.

14. The vehicle of claim 9 further including a third plate interconnecting said first end of said first plate and said first end of said second plate.

15. The vehicle of claim 9 further including a tailgate and a panel blade, said tailgate further defining said cargo area, said panel blade being coupled to said cover and selectively engageable with said tailgate.

16. The vehicle of claim 15 wherein said panel blade is selectively engageable with said second plate.

17. A method for attaching a stake pocket tie down to a vehicle having a stake pocket defined by an inner panel and an outer panel, the method comprising:
inserting a first plate within said stake pocket, said first plate having a first end and a second end;
disposing a second end of a second plate in said stake pocket;
coupling said second end of said second plate to said second end of said first plate;
positioning a first end of said second plate outside said stake pocket; and
coupling said first end of said first plate to said first end of said second plate.

18. The method of claim 17 wherein the inner panel is sandwiched between said first end of said first plate and said first end of said second plate.

19. A method for attaching a stake pocket tie down to a vehicle having a stake pocket defined by an inner panel and an outer panel, the method comprising:
inserting a first plate within said stake pocket, said first plate having a first end and a second end, said first end having a slot;
positioning a second end of a second plate within said slot; and
coupling a first end of said second plate to said first end of said first plate.

20. The method of claim 19 further including interconnecting said first end of said first plate and said first end of said second plate with a third plate.

21. A tonneau cover attachment system for a motor vehicle having a cargo area defined by a first side wall, a second side wall, a bed and a tailgate, the tonneau cover attachment system comprising:
a cover panel adapted to be pivotally coupled to the vehicle for selectively covering at least a portion of the cargo area when said cover panel is in a closed position, said cover panel including a panel blade downwardly extending therefrom; and
a receiver adapted to be coupled to the tailgate, said receiver including a member having an aperture extending therethrough, said member selectively moveable from a first position to a second position, wherein said panel blade is positioned within said aperture when said member is in said first position and when said cover is in said closed position thereby limiting movement of the tailgate.

22. The tonneau cover of claim 21 where said receiver includes a retainer biasedly engaging said member into one of said first and second positions.

23. The tonneau cover of claim 22 wherein said member includes a first leg and a second leg, wherein said first leg extends substantially orthogonally from said second leg and wherein said second leg engages said retainer at a first location when said member is in said first position.

24. The tonneau cover of claim 23 wherein said first leg engages said retainer at a second location spaced apart from said first location when said member is in said second position.

25. The tonneau cover attachment system of claim 21 wherein said panel blade is disengaged from said receiver when said member is in said second position and said cover panel is in said closed position thereby allowing an operator to rotate the tailgate without moving said cover panel from its closed position.

* * * * *